US011402977B1

(12) United States Patent
Truong et al.

(10) Patent No.: US 11,402,977 B1
(45) Date of Patent: Aug. 2, 2022

(54) SYSTEMS AND METHODS FOR ORIENTING WEBPAGE CONTENT BASED ON USER ATTENTION

(71) Applicant: Capital One Services, LLC, McLean, VA (US)

(72) Inventors: Anh Truong, Champaign, IL (US); Brian Barr, Schenectady, NY (US); Christopher Wallace, San Francisco, CA (US); Samuel Sharpe, Cambridge, MA (US); Galen Rafferty, Mahomet, IL (US); Jeremy Edward Goodsitt, Champaign, IL (US); Austin Walters, Savoy, IL (US); Grant Eden, Menlo Park, CA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 17/468,548

(22) Filed: Sep. 7, 2021

(51) Int. Cl.
*G06F 3/0484* (2022.01)
*G06N 20/00* (2019.01)
(Continued)

(52) U.S. Cl.
CPC .......... *G06F 3/0484* (2013.01); *G06F 3/0483* (2013.01); *G06F 9/451* (2018.02); *G06N 20/00* (2019.01)

(58) Field of Classification Search
None
See application file for complete search history.

(56) References Cited

U.S. PATENT DOCUMENTS 8,389,887 B2 * 3/2013 Liebold ................. B23K 9/296
219/121.5
10,762,335 B2   9/2020 Gernoth et al.
(Continued)

OTHER PUBLICATIONS

R. V. Kaushik, R. Raghu, L. M. Reddy, A. Prasad and S. Prasanna, "Ad analysis using machine learning: Classifying and recommending advertisements fora given category of videos, using machine learning," 2017 International Conference on Energy, Communication, Data Analytics and Soft Computing (ICECDS) (Year: 2017).*

*Primary Examiner* — Daniel Rodriguez
*Assistant Examiner* — Gabriel Mercado
(74) *Attorney, Agent, or Firm* — Troutman Pepper Hamilton Sanders LLP; Christopher J. Forstner; John A. Morrissett

(57) ABSTRACT

A system may include processor(s), and memory in communication with the processor(s) and storing instructions configured to cause the system to orient webpage content based on user attention. The system may determine a user has navigated to a webpage. The system may generate an attention level based on received user feature(s) associated with activity of the user on the webpage. Responsive to determining the attention level exceeds a predetermined threshold, the system may identify a duration associated with the attention level, transmit an offer to one or more entities to submit predetermined content based on the duration, receive predetermined content from the one or more entities, identify, based on a predetermined amount of predetermined content space, selected content of the received predetermined content for placement on the webpage, and cause a GUI of the user device to display the selected content.

20 Claims, 7 Drawing Sheets

(51) Int. Cl.
*G06F 9/451* (2018.01)
*G06F 3/0483* (2013.01)

(56) References Cited

U.S. PATENT DOCUMENTS

| | | |
|---|---|---|
| 11,016,713 B2 | 5/2021 | Klein et al. |
| 2009/0222550 A1 | 9/2009 | McAfee et al. |
| 2013/0311036 A1* | 11/2013 | Liu .................... G06Q 30/0241 |
| | | 701/36 |
| 2014/0096152 A1* | 4/2014 | Ferens ............... H04N 21/2668 |
| | | 725/12 |
| 2016/0094670 A1* | 3/2016 | Garcia Manchado .. H04L 67/22 |
| | | 709/217 |
| 2016/0323643 A1* | 11/2016 | Panchaksharaiah ......................... |
| | | H04N 21/4753 |
| 2018/0211285 A1* | 7/2018 | Todasco ............. G06Q 30/0277 |
| 2020/0077136 A1* | 3/2020 | Kwatra ............... H04L 65/4084 |
| 2020/0327604 A1* | 10/2020 | Morin .................... G06N 5/003 |
| 2021/0042077 A1* | 2/2021 | Klein ................. G06Q 30/0266 |
| 2021/0334994 A1* | 10/2021 | Park ....................... G06N 20/00 |

\* cited by examiner

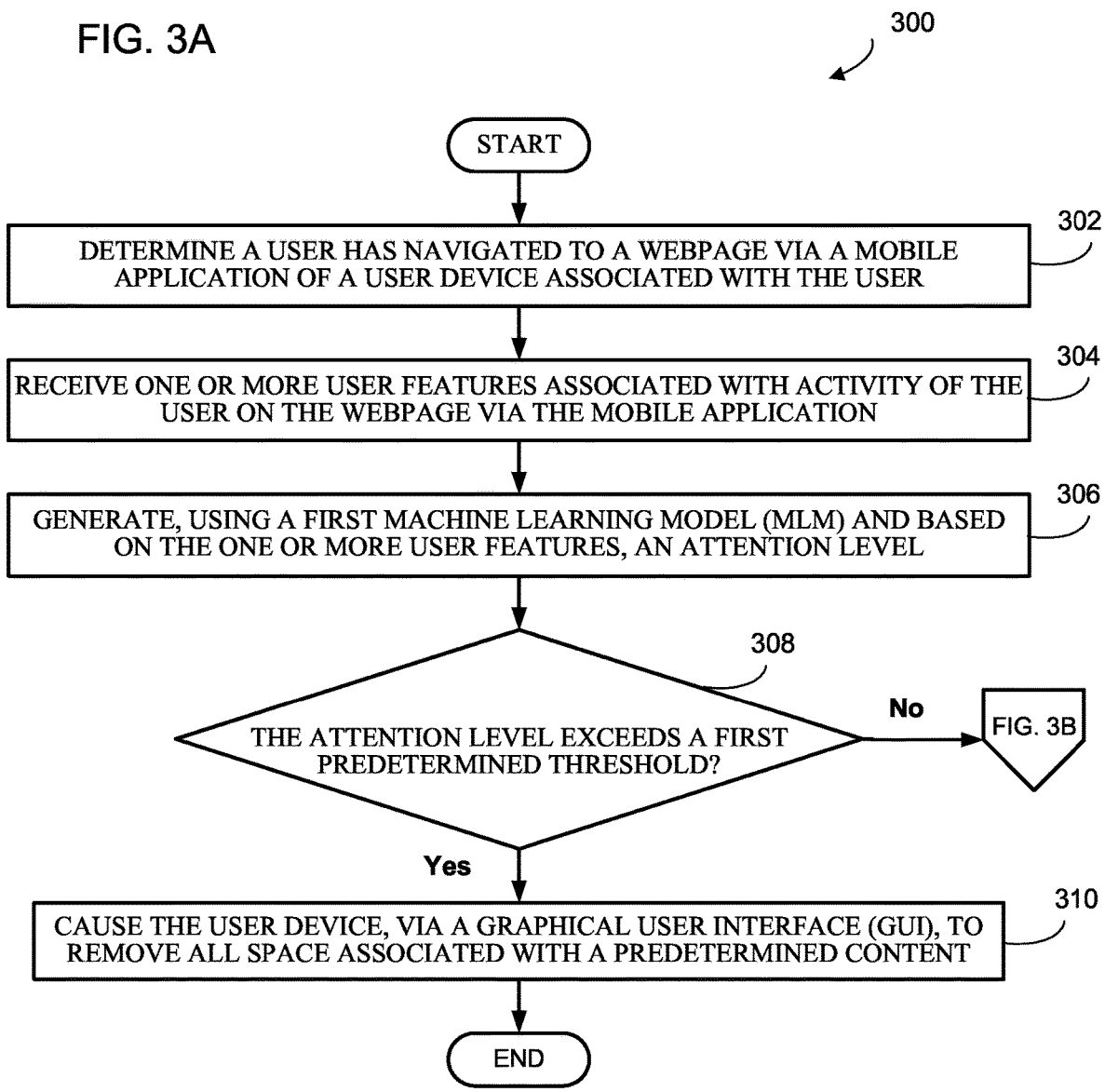

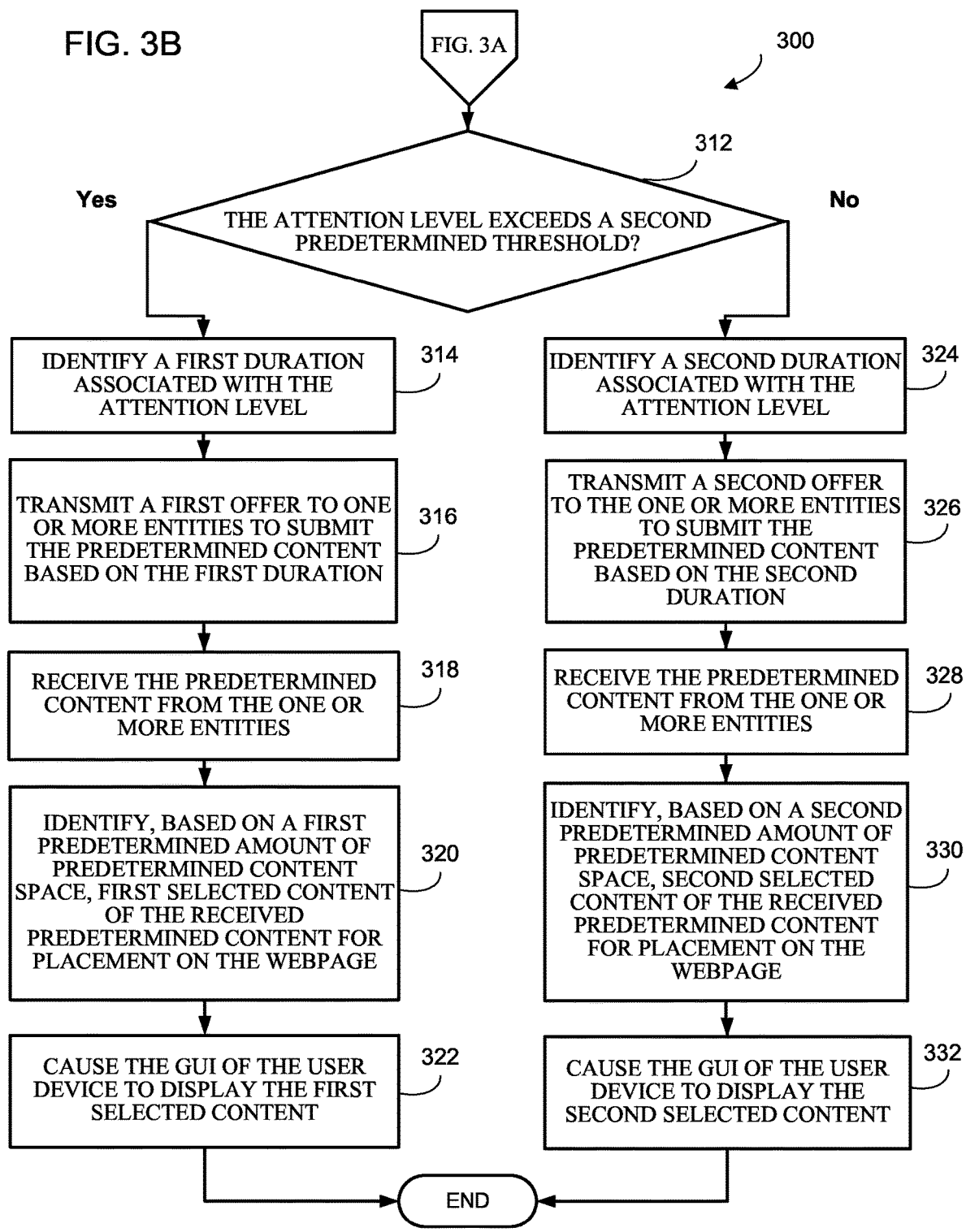

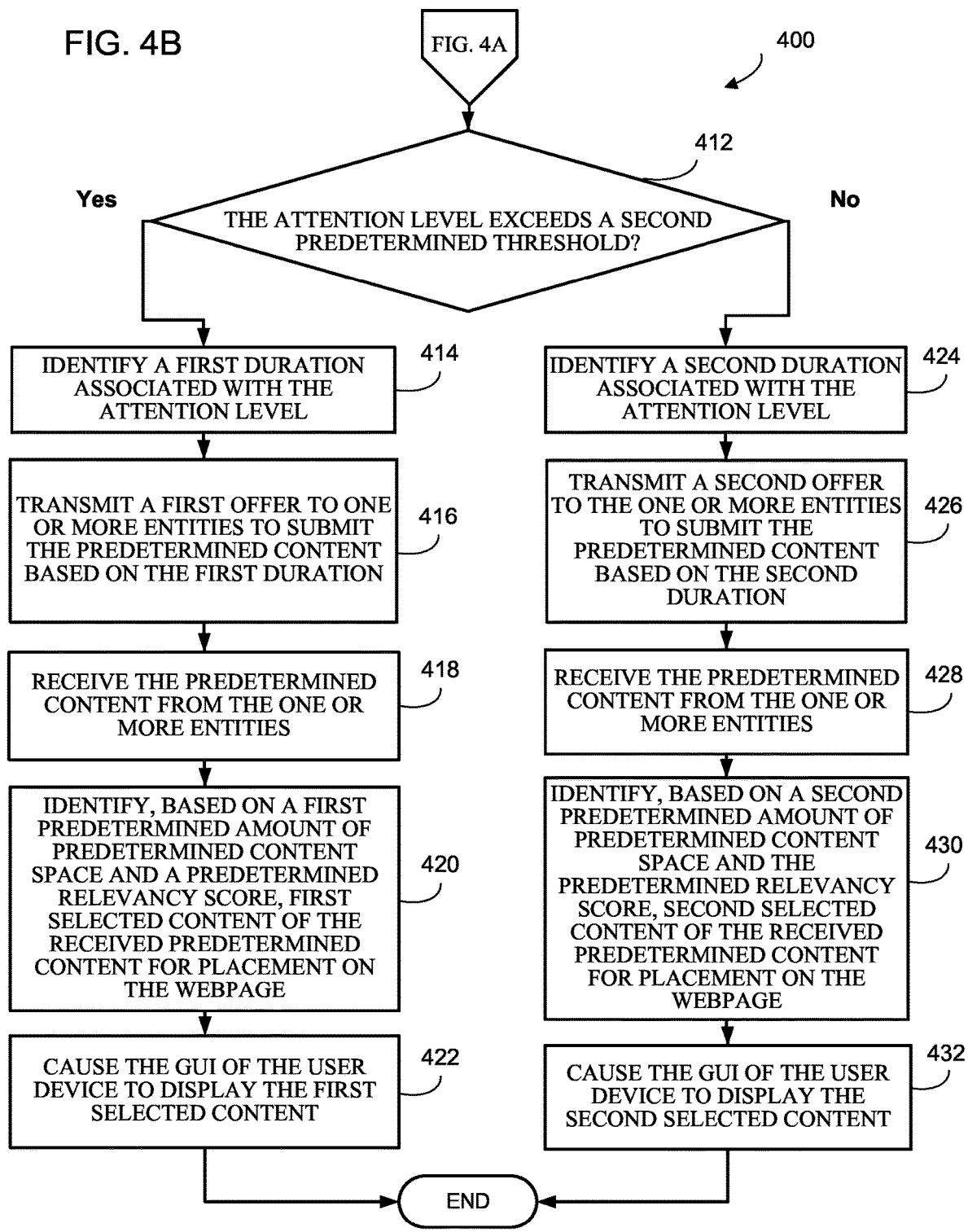

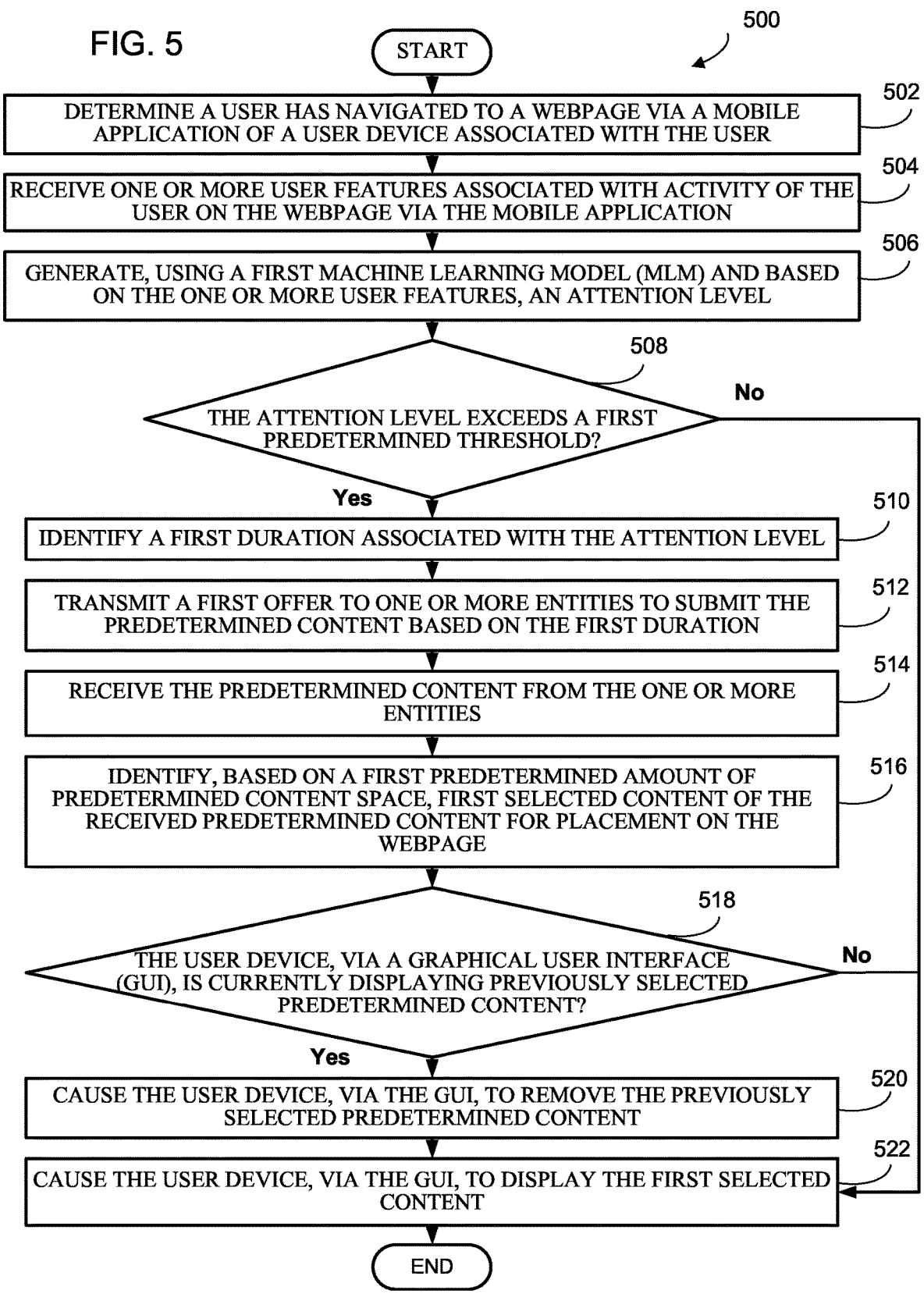

SYSTEMS AND METHODS FOR ORIENTING WEBPAGE CONTENT BASED ON USER ATTENTION

The disclosed technology relates to systems and methods for orienting webpage content based on user attention, and in particular, for orienting webpage content based on comparing a generated attention level to predetermined thresholds.

BACKGROUND

Traditional systems and methods for orienting webpage content generally relate to relevancy. That is, pricing and placement of content (e.g., advertisements) tend to be determined based on how relevant certain content is to certain users based on, for example, purchase history, search history, etc. These traditional systems and methods, however, do not take into account user attention levels or the amount of time that users maintain different attention levels, both of which may influence how likely a user may be to focus on webpage content (e.g., images, text, videos) at any given time.

Accordingly, there is a need for improved systems and methods for orienting webpage content based on user attention. Embodiments of the present disclosure are directed to this and other considerations.

SUMMARY

Disclosed embodiments may include a system for orienting webpage content based on user attention. The system may include one or more processors, and memory in communication with the one or more processors and storing instructions that are configured to cause the system to perform a method for orienting webpage content based on comparing generated attention levels to predetermined thresholds. The system may determine a user has navigated to a webpage via a mobile application of a user device associated with the user. The system may receive one or more user features associated with activity of the user on the webpage via the mobile application. The system may generate, using a first machine learning model (MLM) and based on the one or more user features, an attention level. The system may determine whether the attention level exceeds a first predetermined threshold. Responsive to determining the attention level exceeds the first predetermined threshold, the system may cause the user device, via a graphical user interface (GUI), to remove all space associated with a predetermined content. Responsive to determining the attention level does not exceed the first predetermined threshold, the system may determine whether the attention level exceeds a second predetermined threshold. Responsive to determining the attention level exceeds the second predetermined threshold, the system may identify a first duration associated with the attention level; may transmit a first offer to one or more entities to submit the predetermined content based on the first duration; may receive the predetermined content from the one or more entities; may identify, based on a first predetermined amount of predetermined content space, first selected content of the received predetermined content for placement on the webpage; and may cause the GUI of the user device to display the first selected content. Responsive to determining the attention level does not exceed the second predetermined threshold, the system may identify a second duration associated with the attention level; may transmit a second offer to the one or more entities to submit the predetermined content based on the second duration; may receive the predetermined content from the one or more entities; may identify, based on a second predetermined amount of predetermined content space, second selected content of the received predetermined content for placement on the webpage; and may cause the GUI of the user device to display the second selected content.

In another embodiment, the system may include one or more processors, and memory in communication with the one or more processors and storing instructions that are configured to cause the system to perform a method for orienting webpage content based on comparing generated attention levels to predetermined thresholds. The system may determine a user has navigated to a webpage by utilizing a web browser extension running on a user device associated with the user. The system may receive one or more user features associated with activity of a user on the webpage. The system may generate, using a first MLM and based on the one or more user features, an attention level. The system may determine whether the attention level exceeds a first predetermined threshold. Responsive to determining the attention level exceeds the first predetermined threshold, the system may cause the user device, via a GUI, to remove all space associated with a predetermined content. Responsive to determining the attention level does not exceed the first predetermined threshold, the system may determine whether the attention level exceeds a second predetermined threshold. Responsive to determining the attention level exceeds the second predetermined threshold, the system may identify a first duration associated with the attention level; may transmit a first offer to one or more entities to submit the predetermined content based on the first duration; may receive the predetermined content from the one or more entities; may identify, based on a first predetermined amount of predetermined content space and a predetermined relevancy score, first selected content of the received predetermined content for placement on the webpage; and may cause the GUI of the user device to display the first selected content. Responsive to determining the attention level does not exceed the second predetermined threshold, the system may identify a second duration associated with the attention level; may transmit a second offer to the one or more entities to submit the predetermined content based on the second duration; may receive the predetermined content from the one or more entities; may identify, based on a second predetermined amount of predetermined content space and the predetermined relevancy score, second selected content of the received predetermined content for placement on the webpage; and may cause the GUI of the user device to display the second selected content.

In another embodiment, the system may include one or more processors, and memory in communication with the one or more processors and storing instructions that are configured to cause the system to perform a method for orienting webpage content based on comparing generated attention levels to predetermined thresholds. The system may determine a user has navigated to a webpage via a mobile application of a user device associated with the user. The system may receive one or more user features associated with activity of the user on the webpage via the mobile application. The system may generate, using a first MLM and based on the one or more user features, an attention level. The system may determine whether the attention level exceeds a first predetermined threshold. Responsive to determining the attention level exceeds the first predetermined threshold, the system may identify a first duration associated with the attention level; may transmit a first offer to one or more entities to submit predetermined content based on the first duration; may receive the predetermined content from the one or more entities; may identify, based on a first predetermined amount of predetermined content space, first selected content of the received predetermined content for placement on the webpage; and may determine whether the user device, GUI, is currently displaying previously selected predetermined content. Responsive to determining that the user device, via the GUI, is currently displaying the previously selected predetermined content, the system may cause the user device, via the GUI, to remove the previously selected predetermined content; and may cause the user device, via the GUI, to display the first selected content. Responsive to determining that the user device, via the GUI, is not currently displaying the previously selected predetermined content, the system may cause the user device, via the GUI, to display the first selected content.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings:

FIGS. 3A-3B are a flow diagram illustrating an exemplary method for orienting webpage content based on user attention, in accordance with certain embodiments of the disclosed technology.

FIGS. 4A-4B are a flow diagram illustrating an exemplary method for orienting webpage content based on user attention, in accordance with certain embodiments of the disclosed technology.

FIG. 5 is a flow diagram an illustrating an exemplary method for orienting webpage content based on user attention, in accordance with certain embodiments of the disclosed technology.

DETAILED DESCRIPTION

Examples of the present disclosure relate to systems and methods for orienting webpage content based on user attention. In particular, the disclosed technology relates to systems and methods for determining a user has navigated to a webpage, receiving user features associated with activity of the user on the webpage, generating an attention level of the user, determining whether the attention level exceeds various predetermined thresholds, and responsive to making those determinations, identifying a duration associated with the attention level, selecting predetermined content received from one or more entities for placement on the webpage, and causing a GUI of a user device to display the selected predetermined content. The systems and methods described herein are necessarily rooted in computer and technology as they utilize MLMs to generate attention levels based on user features associated with activity of a user on webpages. Machine learning models are a unique computer technology that involves training the models to complete tasks, such as labeling, categorizing, identifying, or determining whether certain attention levels correspond to higher or lower user attention on various webpages so the MLMs learn how to label, categorize, identify, or determine whether users may pay more or less attention to certain types of content displayed on webpages (e.g., advertisements, images, videos, etc.). Importantly, examples of the present disclosure improve the speed with which computers can perform these automated tasks, by reducing the amount of data necessary to properly train the MLMs to make such determinations.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

Figure 1:
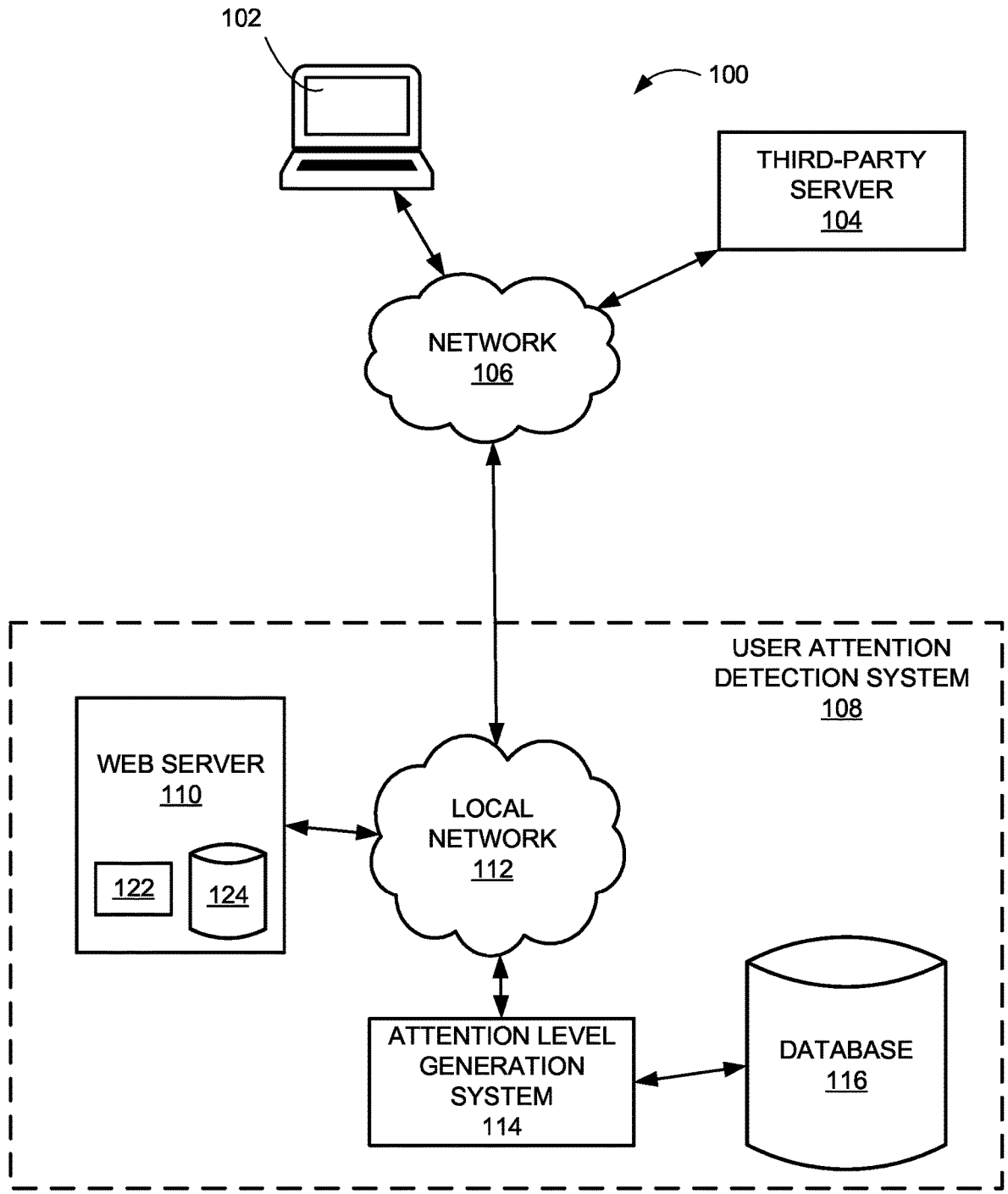
FIG. 1 is a block diagram of an example system that may be used to orient webpage content based on user attention, according to an example implementation of the disclosed technology.

FIG. 1 is a block diagram of an example system that may be used to orient webpage content based on user attention, according to an example implementation of the disclosed technology. The components and arrangements shown in FIG. 1 are not intended to limit the disclosed embodiments as the components used to implement the disclosed processes and features may vary. As shown, user attention detection system 108 may interact with a user device 102 and/or a third-party server 104 via a network 106. In certain example implementations, the user attention detection system 108 may include a local network 112, an attention level generation system 114, a web server 110, and a database 116.

In some embodiments, a user may operate the user device 102. The user device 102 can include one or more of a mobile device, smart phone, general purpose computer, tablet computer, laptop computer, telephone, PSTN landline, smart wearable device, voice command device, other mobile computing device, or any other device capable of communicating with network 106 and ultimately communicating with one or more components of the user attention detection system 108. In some embodiments, the user device 102 may include or incorporate electronic communication devices for hearing or vision impaired users.

Customers may include individuals such as, for example, subscribers, clients, prospective clients, or customers of an entity associated with an organization, such as individuals who have obtained, will obtain, or may obtain a product, service, or consultation from or conduct a transaction in relation to an entity associated with the user attention detection system 108. According to some embodiments, the user device 102 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

Network 106 may be of any suitable type, including individual connections via the internet such as cellular or WiFi networks. In some embodiments, network 106 may connect terminals, services, and mobile devices using direct connections such as radio-frequency identification (RFID), near-field communication (NFC), Bluetooth™, low-energy Bluetooth™ (BLE), WiFi™ ZigBee™, ambient backscatter communications (ABC) protocols, universal serial bus (USB), wide area network (WAN), or local area network (LAN). Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Network 106 may include any type of computer networking arrangement used to exchange data. For example, network 106 may be the Internet, a private data network, virtual private network using a public network, and/or other suitable connection(s) that enable(s) components in the system 100 environment to send and receive information between the components of system 100. Network 106 may also include a public switched telephone network ("PSTN") and/or a wireless network.

User attention detection system 108 may be associated with and optionally controlled by one or more entities such as a business, corporation, individual, partnership, or any other entity that provides one or more of goods, services, and consultations to individuals such as customers. In some embodiments, user attention detection system 108 may be controlled by a third-party on behalf of another business, corporation, individual, partnership. User attention detection system 108 may include one or more servers and computer systems for performing one or more functions associated with products and/or services that the organization provides.

Web server 110 may include a computer system configured to generate and provide one or more websites accessible to customers, as well as any other individuals involved in accessing system 100's normal operations. Web server 110 may include a computer system configured to receive communications from user device 102 via for example, a mobile application, a chat program, an instant messaging program, a voice-to-text program, an SMS message, email, or any other type or format of written or electronic communication. Web server 110 may have one or more processors 122 and one or more web server databases 124, which may be any suitable repository of website data. Information stored in web server 110 may be accessed (e.g., retrieved, updated, and added to) via local network 112 and/or network 106 by one or more devices or systems (e.g., attention level generation system 114) of system 100. In some embodiments, web server 110 may host websites or applications that may be accessed by user device 102. For example, web server 110 may host a financial service provider website that a user device may access by providing an attempted login that are authenticated by attention level generation system 114. According to some embodiments, web server 110 may include software tools, similar to those described with respect to user device 102 above, that may allow web server 110 to obtain network identification data from user device 102.

Local network 112 may include any type of computer networking arrangement used to exchange data in a localized area, such as WiFi, Bluetooth™ Ethernet, and other suitable network connections that enable components of user attention detection system 108 to interact with one another and to connect to network 106 for interacting with components in the system 100 environment. In some embodiments, local network 112 may include an interface for communicating with or linking to network 106. In other embodiments, certain components of user attention detection system 108 may communicate via network 106, without a separate local network 112.

In accordance with certain example implementations of the disclosed technology, user attention detection system 108 may include one or more computer systems configured to compile data from a plurality of sources, for example, attention level generation system 114, web server 110, and/or database 116. Attention level generation system 114 may correlate compiled data, analyze the compiled data, arrange the compiled data, generate derived data based on the compiled data, and store the compiled and derived data in a database such as database 116. According to some embodiments, database 116 may be a database associated with an organization and/or a related entity that stores a variety of information relating to customers, transactions, ATM, and business operations. Database 116 may also serve as a back-up storage device and may contain data and information that is also stored on, for example, database 250, as discussed below with reference to FIG. 2.

Although the preceding description describes various functions of a web server 110, an attention level generation system 114, and a database 116, in some embodiments, some or all of these functions may be carried out by a single computing device or a plurality of computing devices in a (cloud) serverless system.

Figure 2:
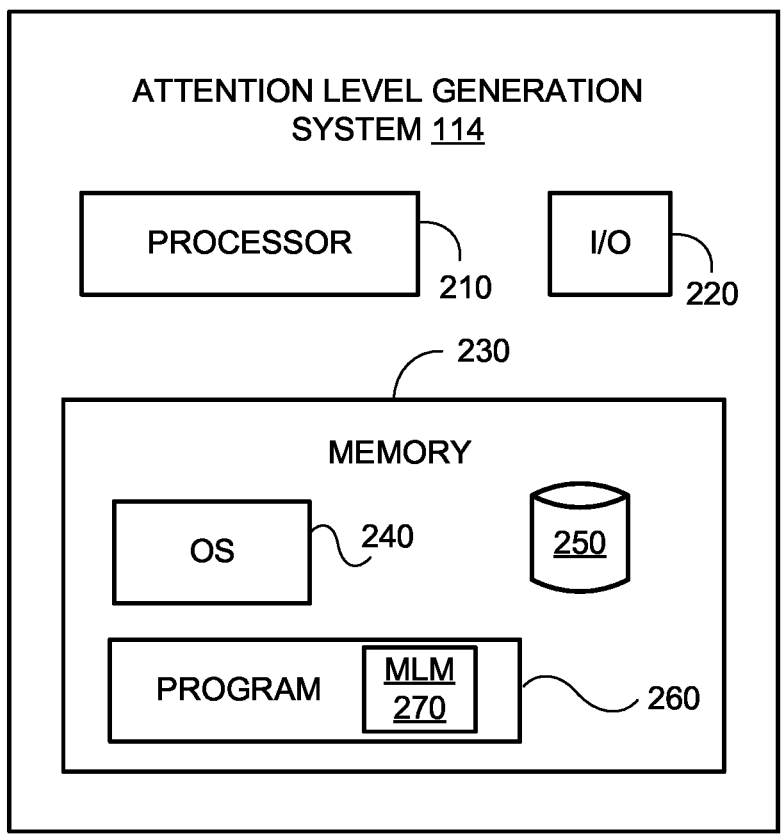
FIG. 2 is a block diagram of an example attention level generation system used to compare user attention levels to predetermined thresholds, according to an example implementation of the disclosed technology.

An example embodiment of attention level generation system 114 is shown in more detail in FIG. 2. According to some embodiments, user device 102 and web server 110, as depicted in FIG. 1 and described above, may have a similar structure and components that are similar to those described with respect to attention level generation system 114 shown in FIG. 2. As shown, attention level generation system 114 may include a processor 210, an input/output ("I/O") device 220, a memory 230 containing an operating system ("OS") 240, a database 250, and a program 260. In some embodiments, program 260 may include an MLM 270 that may be trained, for example, to generate attention levels, and compare those levels to predetermined thresholds to determine how the attention levels correspond to user attention. In certain implementations, MLM 270 may issue commands in response to processing an event, in accordance with a model that may be continuously or intermittently updated. Moreover, processor 210 may execute one or more programs (such as via a rules-based platform or the trained MLM 270), that, when executed, perform functions related to disclosed embodiments.

In certain example implementations, attention level generation system 114 may be a single server or may be configured as a distributed computer system including multiple servers or computers that interoperate to perform one or more of the processes and functionalities associated with the disclosed embodiments. In some embodiments, attention level generation system 114 may be one or more servers from a serverless or scaling server system. In some embodiments, attention level generation system 114 may further include a peripheral interface, a transceiver, a mobile network interface in communication with processor 210, a bus configured to facilitate communication between the various components of attention level generation system 114, and a power source configured to power one or more components of attention level generation system 114.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a USB port, a micro-USB port, a high-definition multimedia (HDMI) port, a video port, an audio port, a Bluetooth™ port, an NFC port, another like communication interface, or any combination thereof.

In some embodiments, a transceiver may be configured to communicate with compatible devices and ID tags when they are within a predetermined range. A transceiver may be compatible with one or more of: RFID, NFC, Bluetooth™, BLE, WiFi™, ZigBee™, ABC protocols or similar technologies.

A mobile network interface may provide access to a cellular network, the Internet, or another wide-area or local area network. In some embodiments, a mobile network interface may include hardware, firmware, and/or software that allow(s) the processor(s) 210 to communicate with other devices via wired or wireless networks, whether local or wide area, private or public, as known in the art. A power source may be configured to provide an appropriate alternating current (AC) or direct current (DC) to power components.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within memory 230.

Processor 210 may be one or more known processing devices, such as, but not limited to, a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc., multiple software processes, applications, programs, etc. One of ordinary skill in the art would understand that other types of processor arrangements could be implemented that provide for the capabilities disclosed herein.

In accordance with certain example implementations of the disclosed technology, attention level generation system 114 may include one or more storage devices configured to store information used by processor 210 (or other components) to perform certain functions related to the disclosed embodiments. In one example, attention level generation system 114 may include memory 230 that includes instructions to enable processor 210 to execute one or more applications, such as server applications, network communication processes, and any other type of application or software known to be available on computer systems. Alternatively, the instructions, application programs, etc., may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, attention level generation system 114 may include a memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, attention level generation system 114 may include memory 230 that may include one or more programs 260 to perform one or more functions of the disclosed embodiments. For example, in some embodiments, attention level generation system 114 may additionally manage dialogue and/or other interactions with the customer via a program 260.

Processor 210 may execute one or more programs located remotely from attention level generation system 114. For example, attention level generation system 114 may access one or more remote programs that, when executed, perform functions related to disclosed embodiments.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. Memory 230 may include software components that, when executed by processor 210, perform one or more processes consistent with the disclosed embodiments. In some embodiments, memory 230 may include database 250 for storing related data to enable attention level generation system 114 to perform one or more of the processes and functionalities associated with the disclosed embodiments.

Attention level generation system 114 may also be communicatively connected to one or more memory devices (e.g., databases) locally or through a network. The remote memory devices may be configured to store information and may be accessed and/or managed by attention level generation system 114. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

Attention level generation system 114 may also include one or more I/O devices 220 that may comprise one or more interfaces for receiving signals or input from devices and providing signals or output to one or more devices that allow data to be received and/or transmitted by attention level generation system 114. For example, attention level generation system 114 may include interface components, which may provide interfaces to one or more input devices, such as one or more keyboards, mouse devices, touch screens, track pads, trackballs, scroll wheels, digital cameras, microphones, sensors, and the like, that enable attention level generation system 114 to receive data from a user (such as, for example, via user device 102).

In example embodiments of the disclosed technology, attention level generation system 114 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While attention level generation system 114 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of attention level generation system 114 may include a greater or lesser number of components than those illustrated.

FIGS. 3A-3B provide a flow diagram illustrating an exemplary method 300 for orienting webpage content based on user attention, in accordance with certain embodiments of the disclosed technology. Method 300 may be performed by one or more components of system 100 (e.g., attention level generation system 114 or web server 110 of user attention detection system 108 or user device 102), as described above with respect to FIGS. 1 and 2.

In block 302 of FIG. 3A, the system (e.g., via user attention detection system 108) may determine a user has navigated to a webpage via a mobile application of a user device associated with the user. The mobile application may be owned by, be operated by, or communicate with a component of the system (e.g., third-party server 104 or web server 110). In some embodiments, the system may determine a user has navigated to a webpage by identifying when the user begins running a web browser extension via a GUI on his or her mobile device (e.g., laptop) as the web browser extension may be owned by, be operated by, or communicate with a component of the system (e.g., third-party server 104 or web server 110).

In block 304, the system (e.g., via user attention detection system 108) may receive one or more user features associated with activity of the user on the webpage via the mobile application. The one or more user features may comprise, for example, a number of search queries conducted by the user, a degree of user cursor movement, an amount of time spent on a given webpage, a degree of user eye movement, whether a user turns on any included audio corresponding to webpage content (e.g., a video), etc. With respect to search queries, a higher number of search queries—particularly concentrated over a shorter period of time—may be indicative of that user being more focused on substantive content contained on the webpage, such as news articles, professional activities, presentation review or generation, etc. In such case, the user may pay less attention to non-substantive content contained on the webpage, such as advertisements, pop-ups, images, videos, etc., particularly those unrelated to the substantive webpage content. The degree of cursor movement may correspond to the speed at which a user moves a cursor from one location on a webpage to another location, and/or whether the user moves the cursor gradually or more directly from one location to another. A faster and/or more direct cursor movement from one location to another on a given webpage may be indicative of that user being more focused on the substantive content of the webpage, and a less chance of that user paying attention to non-substantive content. On the other hand, slower and/or less direct cursor movement may indicate a user's more relaxed state, such as browsing a social media page, and thus a greater likelihood of that user paying attention to non-substantive content. With respect to an amount of time spent on a webpage, a greater amount of time may be more indicative of a higher focus on webpage substantive content; however, this correlation may be dependent on other user features (e.g., search queries, cursor movement, etc.) occurring during that same time. The degree of user eye movement may correspond to the speed and/or directness associated with how a user looks at different types of webpage content, which may provide similar correlations as the degree of cursor movement discussed above. Whether a user turns on associated audio may indicate a user's investment in that webpage content. For example, turning on audio associated with a video advertisement may be indicative of the user's higher level of attention with respect to that advertisement. In some embodiments, one or more of the above-described user features may be used to predict a duration at which the user may maintain his or her attention level, as discussed below with respect to block 314.

In block 306, the system (e.g., via attention level generation system 114) may generate, using a first MLM and based on the one or more user features, an attention level. The MLM may be trained by providing the MLM with a training data that includes one or more first user features each with one or more labels corresponding to the one or more first user features. The one or more labels may correspond to high and low levels of user attention. Based on the training data, the MLM may classify unlabeled data sets, such as each of the one or more received user features, in order to generate a new attention level for that data set. In some embodiments, the MLM may comprise any type of model capable of utilizing a distance metric, such as cosine similarity, Euclidean, hamming, Manhattan, Chebyshev, Minkowski, etc., for comparing typical activity of a user on a webpage to current activity of the user on the webpage. In some embodiments, the MLM may comprise a binary classifier, such as, Support Vector Machine (SVM), Logistic Regression, Random Forest, XGBoost, neural network, etc.

The higher the generated attention level, the more focused a user is likely to be on substantive webpage content (e.g., news articles, professional activities, presentation review, etc.). The lower the generated attention level, the less focused a user is likely to be on substantive webpage content, and therefore the more focused the user is likely to be on non-substantive webpage content (e.g., advertisements, pop-ups, images, videos, etc.).

In decision block 308, the system (e.g., via attention level generation system 114) may determine whether the attention level exceeds a first predetermined threshold. The first predetermined threshold may indicate a user attention level that is high enough to remove any significant likelihood of the user focusing on the non-substantive content on a webpage. That is, the first predetermined threshold may indicate a user is paying such high attention to the substantive content on the webpage, that he or she is unlikely to pay much, if any, attention to the non-substantive content.

In block 310, in response to determining the attention level exceeds the first predetermined threshold, the system (e.g., vi user attention detection system 108) may cause the user device, via a GUI, to remove all space associated with a predetermined content. For example, as discussed above, if the user is paying such high attention to the substantive content on the webpage, the system may be configured to cause the user device to remove webpage space dedicated to non-substantive webpage (e.g., advertisements, pop-ups, images, videos, etc.).

Turning to FIG. 3B, in decision block 312, in response to determining the attention level does not exceed the first predetermined threshold, the system (e.g., via attention level generation system 114) may determine whether the attention level exceeds a second predetermined threshold. That is, the second threshold may be lower than the first threshold such that the second threshold indicates a range of user attention less than that indicated by the first threshold.

In response to determining the attention level exceeds the second predetermined threshold, the system may perform a first series of steps, outlined below in blocks 314, 316, 318, 320, and 322. Alternatively, in response to determining the attention level does not exceed the second predetermined threshold, the system may perform a second series of steps, outlined in blocks 324, 326, 328, 330, and 332. The descriptions of blocks 324, 326, 328, 330, and 332 are the same as or similar to the respective descriptions of blocks 314, 316, 318, 320, and 322 and as such, are not repeated herein for brevity.

In block 314, in response to determining the attention level exceeds the second predetermined threshold, the system (e.g., via user attention detection system 108) may identify a first duration associated with the attention level. That is, the system may be configured to predict how long the generated attention level may be maintained above the second predetermined threshold based on, for example, previous user behavior corresponding to a certain webpage. In some embodiments, the system may make this prediction by utilizing an MLM, as discussed above with respect to block 306. The MLM may be trained in a similar fashion as discussed above with respect to 306. That is, the MLM may be provided with a training data that includes one or more second user features each with one or more attention duration labels corresponding to the one or more second user features. The one or more second user features may comprise the one or more first user features, as discussed above with respect to blocks 304 and 306. The one or more attention duration labels may correspond to varying ranges of time spent across different webpages. Based on the training data, the MLM may be configured to generate a prediction of a range of time, or a duration, associated with the user's attention on the current webpage.

In block 316, the system (e.g., via user attention detection system 108) may transmit a first offer to one or more entities to submit the predetermined content based on the first duration. In some embodiments, the offer may comprise a price or rate at which the system proposes to sell webpage space for displaying the predetermined content (e.g., non-substantive content). The offered price or rate may be selected based on determining the generated attention level exceeds the second threshold and predicting the duration that the attention level will likely be maintained (as described above with respect to blocks 312 and 314). For example, if the system determined a user would likely maintain a higher attention level, i.e., focus more on substantive webpage content, and do so for a longer period of time, thus not focusing as much on the non-substantive webpage content, the system may offer webpage space for displaying the non-substantive webpage content at a lower price or rate. Alternatively, if the system determined a user would likely maintain a lower attention level, i.e., focus less on substantive webpage content and more on non-substantive content, the system may offer webpage space for displaying the non-substantive content at a higher price or rate.

In some embodiments, the one or more entities may have previously submitted proposed types and/or amounts of the predetermined content based on a previously transmitted offer such that the system may be configured to select, in real-time, the types and/or amount of the predetermined content to display on the webpage, as further discussed below.

In block 318, the system (e.g., via user attention detection system 108) may receive the predetermined content from the one or more entities. That is, the system may receive submissions from the one or more entities with the predetermined content each entity is willing to have displayed on the webpage given the generated attention level of the user, the predicted duration of that attention level, and/or the price or rate associated with the attention level and duration, as discussed above. In some embodiments, as discussed above, the system may already have a collection of previously submitted predetermined content from the one or more entities. Each of the one or more entities may have indicated at what attention level, duration, and/or rate each entity would be willing to have its predetermined content displayed on the webpage. For example, a first entity may submit to the system one or more advertisements to be maintained, e.g., in a database (e.g., database 116), along with indications of at what attention level, duration, and/or rate the first entity is willing to have each advertisement displayed. That is, the first entity may, for example, submit one or more advertisements and indicate that a first advertisement should only be displayed if the user attention level exceeds the second predetermined threshold for a duration of at least ten minutes, and a second advertisement should only be displayed if the user attention level does not exceed the second predetermined threshold for a duration of at least five minutes (as discussed above with respect to blocks 312 and 314 (324)).

In block 320, the system (e.g., via user attention detection system 108) may identify, based on a first predetermined amount of predetermined content space, first selected content of the received predetermined content for placement on the webpage. That is, the system may have previously identified how much space on the webpage may be dedicated for displaying the predetermined content such that the system is configured to select enough predetermined content from the received predetermined content to fill the allocated webpage space. For example, the system may have previously identified that after displaying substantive content on the webpage, there is a certain amount of space left along the top and bottom banners of the webpage where non-substantive content may be displayed.

In some embodiments, the system may identify the first selected content based further on a predefined relevancy score. That is, the system may be configured to utilize, e.g., a trained MLM, to determine how relevant certain types of predetermined content are to a user based on, for example, historical consumption data, search history, purchase history, etc., of the user across multiple webpages. Identifying the first selected content based further on the predefined relevancy score may enable the one or more entities to determine and submit one or more types of targeted predetermined content for a particular user.

In block 322, the system (e.g., via user attention detection system 108) may cause the GUI of the user device to display the first selected content. That is, after identifying the first selected content, the system may cause the GUI of the user device to display the first selected content, e.g., along the top and bottom banners of the webpage. In some embodiments, the system may be configured to cause the GUI to display the first selected content in varying sizes and/or formats. For example, the system may cause the GUI to display certain portions of the first selected content along the top banner in a larger size and certain other portions of the first selected content along the bottom banner in a smaller size. In some embodiments, the system may be configured to cause the GUI to modify sizes and/or formats of currently displayed content, for example, to bring more user attention to the newly identified first selected content. For example, the system may cause the GUI to decrease the size of certain currently displayed content and move it to the left banner of the webpage. At the same time, the system may then cause the GUI to display the newly identified first selected content along the right banner of the webpage and in a larger size than the currently displayed content along the left banner.

Figure 4A:
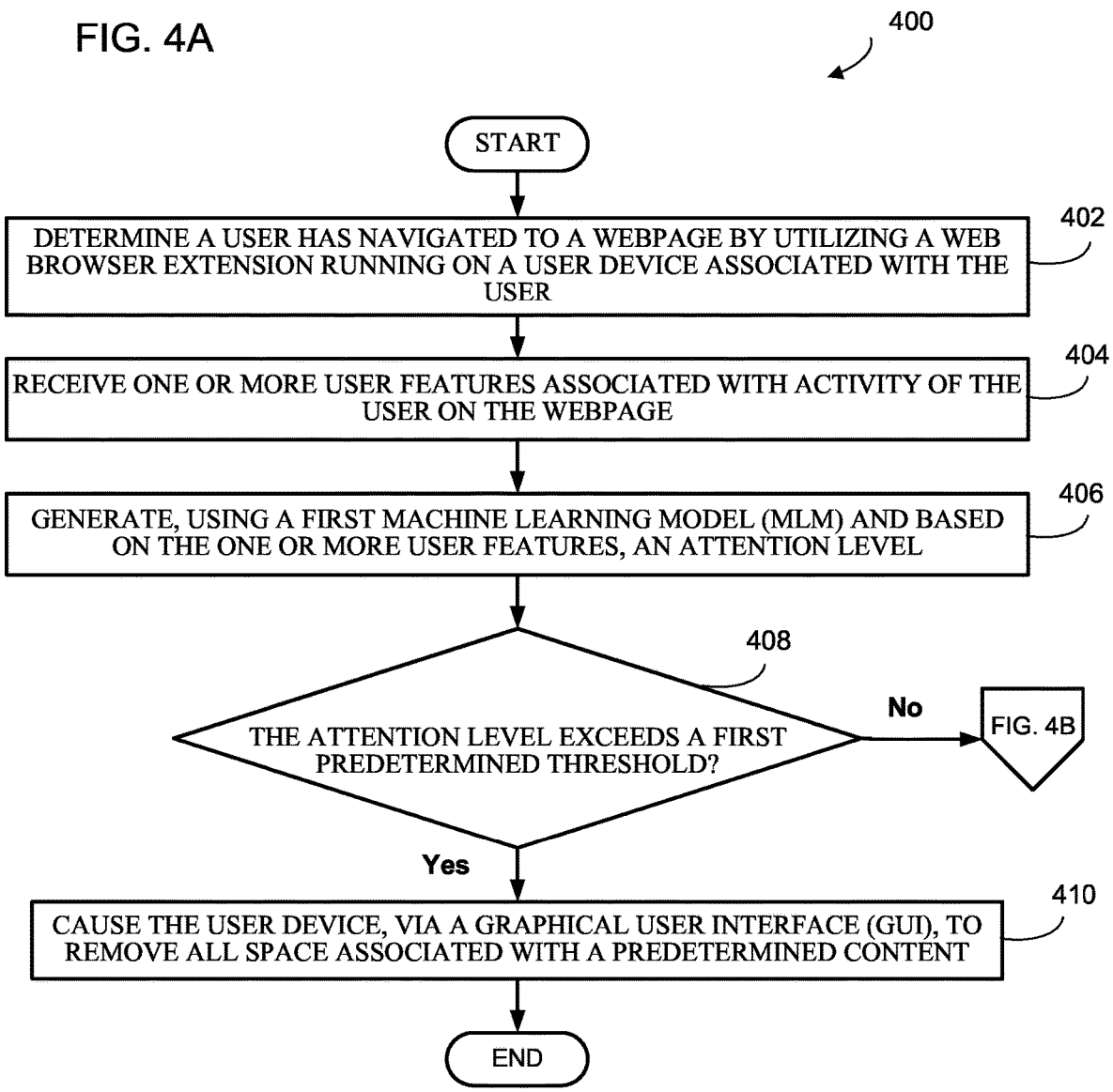

Method 400 of FIGS. 4A-4B is similar to method 300 of FIGS. 3A-3B, except that method 400 uses a web browser extension to identify a user has navigated to a webpage and identifies selected content based on both space and relevancy, while method 300 uses a mobile application to identify a user has navigated to a webpage and identifies selected content based only on space. The descriptions of blocks 402, 404, 406, 408, 410, 412, 414, 416, 418, 420, 422, 424, 426, 428, 430, and 432 are the same as or similar to the respective descriptions of blocks 302, 304, 306, 308, 310, 312, 314, 316, 318, 320, 322, 324, 326, 328, 330, and 332 of method 300 and as such, are not repeated herein for brevity.

Method 500 of FIG. 5 is also similar to method 300 of FIGS. 3A-3B, except that method 500 also includes determining whether a user device GUI is already displaying webpage content, and if so, causing the user device to remove the displayed content to replace it with new content. The descriptions of blocks 502, 504, 506, 508, 510, 512, 514, 516, and 522 are the same as or similar to the respective descriptions of blocks 302, 304, 306, 308, 314, 316, 318, 320, and 322 of method 300 and as such, are not repeated herein for brevity.

In block 518 of FIG. 5, the system (e.g., via user attention detection system 108) may determine whether the user device, via a GUI, is currently displaying previously selected predetermined content.

In block 520 of FIG. 5, responsive to determining that the user device, via the GUI, is currently displaying the previously selected predetermined content, the system (e.g., via user attention detection system 108) may cause the user device, via the GUI, to remove the previously selected predetermined content. As discussed above with respect to block 322, the system may be configured to cause the GUI to modify sizes and/or formats of currently displayed content to bring more user attention to the newly identified first selected content. In block 520, however, the system may cause the user device, via the GUI, to completely remove currently displayed content such that only newly identified predetermined content may be displayed on the webpage.

Alternatively, responsive to determining that the user device, via the GUI, is not currently displaying the previously selected predetermined content, the system (e.g., via user attention detection system 108) may cause the user device, via the GUI, to display the first selected content, as discussed above with respect to block 322.

Example Use Case

The following example use case describes an example of a typical user flow pattern. This section is intended solely for explanatory purposes and not in limitation.

In one example, an organization may utilize a system (e.g., system 100) for orienting advertisements on a webpage based on user attention in order to charge different pricing for advertisement space based on how likely users are to focus on those advertisements. The system (e.g., via user attention detection system 108) may first determine a user has navigated to a social media page via a mobile application running on the user's laptop, the mobile application owned and operated by the organization. The system (e.g., via attention level generation system 114) may utilize a first trained MLM to generate an attention level for the user based on the degree of the user's cursor movement while on the social media page, e.g., slow and gradual as the user scrolls through friends' social media posts. The system may determine that the generated attention level does not exceed a first (i.e., highest) predetermined threshold, but does exceeds a second predetermined threshold. Based on determining the attention level exceeds the second predetermined threshold, the system may utilize a second trained MLM to identify a duration of time associated with the attention level. That is, the second trained MLM may predict how long the user may remain on the social media page (e.g., 30 minutes) based on previous time spent by the user on various social media pages. The system may then identify and retrieve from a database (e.g., database 116) a certain grouping of advertisements that were previously submitted by a group of entities, wherein each of the entities indicated its willingness to display these advertisements at a time when a user's attention level exceeds the second predetermined threshold, the user is estimated to remain on the given webpage for at least 30 minutes, and the organization may charge at least a certain dollar rate per minute to have the advertisements displayed. The system may then identify that the user's social media page is currently displaying a grouping of advertisements along the right-hand side of the webpage. The system may cause the user's mobile phone, via a GUI, to remove the currently displayed grouping of advertisements and replace them with the newly identified grouping of advertisements.

In some examples, disclosed systems or methods may involve one or more of the following clauses:

Clause 1: A system comprising: one or more processors; and memory in communication with the one or more processors and storing instructions that are configured to cause the system to: determine a user has navigated to a webpage via a mobile application of a user device associated with the user; receive one or more user features associated with activity of the user on the webpage via the mobile application; generate, using a first machine learning model (MLM) and based on the one or more user features, an attention level; determine whether the attention level exceeds a first predetermined threshold; responsive to determining the attention level exceeds the first predetermined threshold, cause the user device, via a graphical user interface (GUI), to remove all space associated with a predetermined content;

responsive to determining the attention level does not exceed the first predetermined threshold, determine whether the attention level exceeds a second predetermined threshold; responsive to determining the attention level exceeds the second predetermined threshold: identify a first duration associated with the attention level; transmit a first offer to one or more entities to submit the predetermined content based on the first duration; receive the predetermined content from the one or more entities; identify, based on a first predetermined amount of predetermined content space, first selected content of the received predetermined content for placement on the webpage; and cause the GUI of the user device to display the first selected content; and responsive to determining the attention level does not exceed the second predetermined threshold: identify a second duration associated with the attention level; transmit a second offer to the one or more entities to submit the predetermined content based on the second duration; receive the predetermined content from the one or more entities; identify, based on a second predetermined amount of predetermined content space, second selected content of the received predetermined content for placement on the webpage; and cause the GUI of the user device to display the second selected content.

Clause 2: The system of clause 1, wherein the one or more user features comprise one or more of number of search queries, degree of cursor movement, time spent on the webpage, or combinations thereof.

Clause 3: The system of clause 2, wherein the degree of cursor movement corresponds to a speed at which the user moves a cursor from a first location on the webpage to a second location on the webpage.

Clause 4: The system of clause 1, wherein identifying the first selected content and the second selected content are further based on a predetermined relevancy score corresponding to historical consumption data of the user across multiple webpages.

Clause 5: The system of clause 4, wherein the predetermined relevancy score enables the one or more entities to determine one or more types of targeted predetermined content for the user.

Clause 6: The system of clause 1, wherein the first MLM comprises a binary classification model.

Clause 7: The system of clause 1, wherein the first MLM utilizes one or more distance metrics to compare typical activity of the user on the webpage to current activity of the user on the webpage.

Clause 8: The system of clause 7, wherein at least one of the one or more distance metrics comprises a cosine similarity.

Clause 9: A system comprising: one or more processors; and memory in communication with the one or more processors and storing instructions that are configured to cause the system to: determine a user has navigated to a webpage by utilizing a web browser extension running on a user device associated with the user; receive one or more user features associated with activity of a user on the webpage; generate, using a first machine learning model (MLM) and based on the one or more user features, an attention level; determine whether the attention level exceeds a first predetermined threshold; responsive to determining the attention level exceeds the first predetermined threshold, cause the user device, via a graphical user interface (GUI), to remove all space associated with a predetermined content; responsive to determining the attention level does not exceed the first predetermined threshold, determine whether the attention level exceeds a second predetermined threshold; responsive to determining the attention level exceeds the second predetermined threshold: identify a first duration associated with the attention level; transmit a first offer to one or more entities to submit the predetermined content based on the first duration; receive the predetermined content from the one or more entities; identify, based on a first predetermined amount of predetermined content space and a predetermined relevancy score, first selected content of the received predetermined content for placement on the webpage; and cause the GUI of the user device to display the first selected content; and responsive to determining the attention level does not exceed the second predetermined threshold: identify a second duration associated with the attention level; transmit a second offer to the one or more entities to submit the predetermined content based on the second duration; receive the predetermined content from the one or more entities; identify, based on a second predetermined amount of predetermined content space and the predetermined relevancy score, second selected content of the received predetermined content for placement on the webpage; and cause the GUI of the user device to display the second selected content.

Clause 10: The system of clause 9, wherein the first MLM comprises a binary classification model.

Clause 11: The system of clause 9, wherein the first MLM utilizes cosine similarity to compare typical activity of the user on the webpage to current activity of the user on the webpage.

Clause 12: The system of clause 9, wherein the one or more user features comprise one or more of number of search queries, degree of cursor movement, time spent on the webpage, or combinations thereof.

Clause 13: The system of clause 12, wherein the degree of cursor movement corresponds to a speed at which the user moves a cursor from a first location on the webpage to a second location on the webpage.

Clause 14: The system of clause 9, wherein the predetermined relevancy score corresponds to historical consumption data of the user across multiple webpages.

Clause 15: The system of clause 14, wherein the predetermined relevancy score enables the one or more entities to determine one or more types of targeted predetermined content for the user.

Clause 16: A system comprising: one or more processors; and memory in communication with the one or more processors and storing instructions that are configured to cause the system to: determine a user has navigated to a webpage via a mobile application of a user device associated with the user; receive one or more user features associated with activity of the user on the webpage via the mobile application; generate, using a first machine learning model (MLM) and based on the one or more user features, an attention level; determine whether the attention level exceeds a first predetermined threshold; and responsive to determining the attention level exceeds the first predetermined threshold: identify a first duration associated with the attention level; transmit a first offer to one or more entities to submit predetermined content based on the first duration; receive the predetermined content from the one or more entities; identify, based on a first predetermined amount of predetermined content space, first selected content of the received predetermined content for placement on the webpage; determine whether the user device, via a graphical user interface (GUI), is currently displaying previously selected predetermined content; responsive to determining that the user device, via the GUI, is currently displaying the previously selected predetermined content: cause the user device, via the GUI, to remove the previously selected predetermined content; and cause the user device, via the GUI, to display the first selected content; and responsive to determining that the user device, via the GUI, is not currently displaying the previously selected predetermined content, cause the user device, via the GUI, to display the first selected content.

Clause 17: The system of clause 16, wherein the one or more user features comprise one or more of number of search queries, degree of cursor movement, time spent on the webpage, or combinations thereof, and wherein the degree of cursor movement corresponds to a speed at which the user moves a cursor from a first location on the webpage to a second location on the webpage.

Clause 18: The system of clause 16, wherein identifying the first selected content is further based on a predetermined relevancy score corresponding to historical consumption data of the user across multiple webpages.

Clause 19: The system of clause 16, wherein the first MLM comprises a binary classification model.

Clause 20: The system of clause 19, wherein the first MLM utilizes cosine similarity to compare typical activity of the user on the webpage to current activity of the user on the webpage.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
   one or more processors; and
   a memory in communication with the one or more processors and storing instructions that, when executed by the one or more processors, are configured to cause the system to:
   determine a user has navigated to a webpage via a mobile application of a user device associated with the user;
   receive one or more user features associated with activity of the user on the webpage via the mobile application;
   generate, using a first machine learning model (MLM) and based on the one or more user features, an attention level;
   determine whether the attention level exceeds a first predetermined threshold;
   responsive to determining the attention level exceeds the first predetermined threshold, cause the user device, via a graphical user interface (GUI), to remove all space associated with a predetermined content;
   responsive to determining the attention level does not exceed the first predetermined threshold, determine whether the attention level exceeds a second predetermined threshold;
   responsive to determining the attention level exceeds the second predetermined threshold:

identify a first duration associated with the attention level;

transmit a first offer to one or more entities to submit the predetermined content based on the first duration;

receive the predetermined content from the one or more entities;

identify, based on a first predetermined amount of predetermined content space, first selected content of the received predetermined content for placement on the webpage; and cause the GUI of the user device to display the first selected content; and responsive to determining the attention level does not exceed the second predetermined threshold:

identify a second duration associated with the attention level;

transmit a second offer to the one or more entities to submit the predetermined content based on the second duration;

receive the predetermined content from the one or more entities;

identify, based on a second predetermined amount of predetermined content space, second selected content of the received predetermined content for placement on the webpage; and cause the GUI of the user device to display the second selected content.

2. The system of claim 1, wherein the one or more user features comprise one or more of number of search queries, degree of cursor movement, time spent on the webpage, or combinations thereof.

3. The system of claim 2, wherein the degree of cursor movement corresponds to a speed at which the user moves a cursor from a first location on the webpage to a second location on the webpage.

4. The system of claim 1, wherein identifying the first selected content and the second selected content are further based on a predetermined relevancy score corresponding to historical consumption data of the user across multiple webpages.

5. The system of claim 4, wherein the predetermined relevancy score enables the one or more entities to determine one or more types of targeted predetermined content for the user.

6. The system of claim 1, wherein the first MLM comprises a binary classification model.

7. The system of claim 1, wherein the first MLM utilizes one or more distance metrics to compare typical activity of the user on the webpage to current activity of the user on the webpage.

8. The system of claim 7, wherein at least one of the one or more distance metrics comprises a cosine similarity.

9. A system comprising:
one or more processors; and
a memory in communication with the one or more processors and storing instructions that, when executed by the one or more processors, are configured to cause the system to:

determine a user has navigated to a webpage by utilizing a web browser extension running on a user device associated with the user;

receive one or more user features associated with activity of a user on the webpage;

generate, using a first machine learning model (MLM) and based on the one or more user features, an attention level;

determine whether the attention level exceeds a first predetermined threshold;

responsive to determining the attention level exceeds the first predetermined threshold, cause the user device, via a graphical user interface (GUI), to remove all space associated with a predetermined content;

responsive to determining the attention level does not exceed the first predetermined threshold, determine whether the attention level exceeds a second predetermined threshold;

responsive to determining the attention level exceeds the second predetermined threshold:

identify a first duration associated with the attention level;

transmit a first offer to one or more entities to submit the predetermined content based on the first duration;

receive the predetermined content from the one or more entities;

identify, based on a first predetermined amount of predetermined content space and a predetermined relevancy score, first selected content of the received predetermined content for placement on the webpage; and cause the GUI of the user device to display the first selected content; and responsive to determining the attention level does not exceed the second predetermined threshold:

identify a second duration associated with the attention level;

transmit a second offer to the one or more entities to submit the predetermined content based on the second duration;

receive the predetermined content from the one or more entities;

identify, based on a second predetermined amount of predetermined content space and the predetermined relevancy score, second selected content of the received predetermined content for placement on the webpage; and cause the GUI of the user device to display the second selected content.

10. The system of claim 9, wherein the first MLM comprises a binary classification model.

11. The system of claim 9, wherein the first MLM utilizes cosine similarity to compare typical activity of the user on the webpage to current activity of the user on the webpage.

12. The system of claim 9, wherein the one or more user features comprise one or more of number of search queries, degree of cursor movement, time spent on the webpage, or combinations thereof.

13. The system of claim 12, wherein the degree of cursor movement corresponds to a speed at which the user moves a cursor from a first location on the webpage to a second location on the webpage.

14. The system of claim 9, wherein the predetermined relevancy score corresponds to historical consumption data of the user across multiple webpages.

15. The system of claim 14, wherein the predetermined relevancy score enables the one or more entities to determine one or more types of targeted predetermined content for the user.

16. A system comprising:
one or more processors; and a memory in communication with the one or more processors and storing instructions that, when executed by the one or more processors, are configured to cause the system to:
- determine a user has navigated to a webpage via a mobile application of a user device associated with the user;
- receive one or more user features associated with activity of the user on the webpage via the mobile application;
- generate, using a first machine learning model (MLM) and based on the one or more user features, an attention level;
- determine whether the attention level exceeds a first predetermined threshold;
- responsive to determining the attention level exceeds the first predetermined threshold, cause the user device, via a graphical user interface (GUI), to remove all space associated with a predetermined content;
- responsive to determining the attention level does not exceed the first predetermined threshold, determine whether the attention level exceeds a second predetermined threshold; and
- responsive to determining the attention level exceeds the second predetermined threshold:
  - identify a first duration associated with the attention level;
  - transmit a first offer to one or more entities to submit the predetermined content based on the first duration;
  - receive the predetermined content from the one or more entities;
  - identify, based on a first predetermined amount of predetermined content space, first selected content of the received predetermined content for placement on the webpage;
  - determine whether the user device, via the GUI, is currently displaying previously selected predetermined content;
  - responsive to determining that the user device, via the GUI, is currently displaying the previously selected predetermined content:
    - cause the user device, via the GUI, to remove the previously selected predetermined content; and
    - cause the user device, via the GUI, to display the first selected content; and
  - responsive to determining that the user device, via the GUI, is not currently displaying the previously selected predetermined content, cause the user device, via the GUI, to display the first selected content.

17. The system of claim 16, wherein the one or more user features comprise one or more of number of search queries, degree of cursor movement, time spent on the webpage, or combinations thereof, and wherein the degree of cursor movement corresponds to a speed at which the user moves a cursor from a first location on the webpage to a second location on the webpage.

18. The system of claim 16, wherein identifying the first selected content is further based on a predetermined relevancy score corresponding to historical consumption data of the user across multiple webpages.

19. The system of claim 16, wherein the first MLM comprises a binary classification model.

20. The system of claim 19, wherein the first MLM utilizes cosine similarity to compare typical activity of the user on the webpage to current activity of the user on the webpage.

* * * * *